United States Patent
Zoellin et al.

(10) Patent No.: US 8,353,213 B2
(45) Date of Patent: Jan. 15, 2013

(54) SENSOR ELEMENT FOR SENSING ACCELERATIONS IN THREE SPATIAL DIRECTIONS

(75) Inventors: Jochen Zoellin, Stuttgart (DE); Axel Franke, Ditzingen (DE); Kathrin Van Teeffelen, Stuttgart (DE); Christina Leinenbach, Ensdorf (DE)

(73) Assignee: Robert Bosch GmbH, Stuttgart (DE)

( * ) Notice: Subject to any disclaimer, the term of this patent is extended or adjusted under 35 U.S.C. 154(b) by 349 days.

(21) Appl. No.: 12/678,669

(22) PCT Filed: Sep. 19, 2008

(86) PCT No.: PCT/EP2008/062525
§ 371 (c)(1),
(2), (4) Date: Mar. 17, 2010

(87) PCT Pub. No.: WO2009/043738
PCT Pub. Date: Apr. 9, 2009

(65) Prior Publication Data
US 2010/0206076 A1 Aug. 19, 2010

(30) Foreign Application Priority Data
Sep. 26, 2007 (DE) .................. 10 2007 046 017

(51) Int. Cl.
*G01P 15/125* (2006.01)
*G01P 15/08* (2006.01)
(52) U.S. Cl. .............. 73/514.32; 73/514.38; 73/510
(58) Field of Classification Search .............. 73/514.32, 73/510, 511, 514.38, 514.18
See application file for complete search history.

(56) References Cited

U.S. PATENT DOCUMENTS

| | | | | |
|---|---|---|---|---|
| 5,406,848 A | * | 4/1995 | Okada | 73/514.32 |
| 5,497,668 A | * | 3/1996 | Okada | 73/862.626 |
| 5,864,064 A | * | 1/1999 | Kano et al. | 73/514.36 |
| 5,962,787 A | * | 10/1999 | Okada et al. | 73/514.32 |
| 6,772,632 B2 | * | 8/2004 | Okada | 73/514.38 |
| 7,262,071 B2 | * | 8/2007 | Larmer et al. | 438/53 |
| 7,398,683 B2 | * | 7/2008 | Lehtonen | 73/514.32 |
| 7,578,189 B1 | * | 8/2009 | Mehregany | 73/514.18 |
| 7,640,805 B2 | * | 1/2010 | Diamond et al. | 73/514.32 |
| 7,834,409 B2 | * | 11/2010 | Reichenbach et al. | 257/419 |

OTHER PUBLICATIONS

Gang Li et al., "Design and fabrication of a highly symmetrical capacitive triaxial accelerometer", Journal of Micromechanics and Microengineering 11 (2001) 48-54.

* cited by examiner

*Primary Examiner* — Helen C. Kwok
(74) *Attorney, Agent, or Firm* — Kenyon & Kenyon LLP

(57) ABSTRACT

A sensor element is provided for sensing accelerations in three spatial directions, which furnishes reliable measurement results and moreover can be implemented economically and with a small configuration. The sensor element encompasses at least one seismic mass deflectable in three spatial directions, a diaphragm structure that functions as a suspension mount for the seismic mass, and at least one stationary counterelectrode for capacitive sensing of the deflections of the diaphragm structure. According to the exemplary embodiments and/or exemplary methods of the present invention, the diaphragm structure encompasses at least four electrode regions, electrically separated from one another, that are mechanically coupled via the seismic mass.

8 Claims, 5 Drawing Sheets

SENSOR ELEMENT FOR SENSING ACCELERATIONS IN THREE SPATIAL DIRECTIONS

FIELD OF THE INVENTION

The present invention relates to a sensor element for sensing accelerations in three spatial directions, having at least one seismic mass deflectable in three spatial directions, having a diaphragm structure that functions as a suspension mount for the seismic mass and encompasses at least one electrode, and having at least one stationary counterelectrode for capacitive sensing of the deflections of the diaphragm structure.

BACKGROUND INFORMATION

In the consumer sector in particular, there is an increasing demand for economical acceleration sensors for all three spatial directions having a small configuration and the lowest possible energy consumption.

Gang Li et al., "Design and fabrication of a highly symmetrical capacitive triaxial accelerometer," Journal of Micromechanics and Microengineering 11 (2001) 48-54, describe a micromechanical sensor element of the kind cited initially with which accelerations in all three spatial directions can be sensed. The known sensor element encompasses a seismic mass of truncated pyramidal shape, having a square base surface, which is suspended in a frame via four struts so that it is deflectable in all three spatial dimensions. The seismic mass is patterned out of a semiconductor substrate, while the four struts are configured only in a surface layer of this substrate. As a result of corresponding doping, this surface layer functions as an electrode. The configuration of the known sensor element further encompasses a rigid glass wafer that spans across the suspension struts and the seismic mass but is disposed at a distance from the doped substrate surface. The surface of the glass wafer facing toward the doped substrate surface is equipped with multiple counterelectrodes. The individual directional components of an acceleration acting on the seismic mass are ascertained here by evaluating the capacitances that are sensed between the substrate-side electrode and the individual glass-wafer-side counterelectrodes.

The above-discussed sensor element thus encompasses a seismic mass having only one movable electrode but multiple stationary counterelectrodes disposed at a distance from one another on a glass wafer, so that multiple electrode pairs are available for capacitive signal sensing.

Manufacture of the this sensor element is comparatively complex, since the glass wafer and the semiconductor substrate must be processed independently of one another, and then joined to one another in aligned fashion. In addition, the semiconductor substrate must be processed on two sides. Patterning of the back side, in particular, in order to disengage the seismic mass, requires special method steps. In addition, the space requirement of a component structure produced using bulk micromechanics is relatively large.

SUMMARY OF THE INVENTION

Proceeding from this existing art, a sensor element for sensing accelerations in three spatial directions, which furnishes reliable measurement results and moreover can be implemented economically and with a small configuration, is proposed.

According to the exemplary embodiments and/or exemplary methods of the present invention, the diaphragm structure of the claimed sensor element encompasses at least four electrode regions, electrically separated from one another, that are mechanically coupled via the seismic mass. This is because it has been recognized that multiple electrode regions insulated from one another can also be easily implemented on a diaphragm structure. Depending on whether the sensor element encompasses one or more stationary counterelectrodes, multiple electrically and mechanically coupled, or even only mechanically coupled, capacitances are then available for signal sensing. The formation of insulated electrode regions in the diaphragm structure proves to be advantageous in terms of process technology, and enables a high degree of miniaturization.

In an advantageous embodiment of the sensor element according to the present invention that is notable for a particularly low overall height for the sensor structure, an opening into which the seismic mass projects is embodied in the counterelectrode. This opening must be sufficiently large that the movement of the seismic mass is not inhibited by the counterelectrode.

The structure of the sensor element according to the present invention can advantageously be implemented, using surface micromechanics methods, in a layer configuration above a semiconductor substrate, in particular the diaphragm structure having the electrode regions separated electrically from one another and the counterelectrode, a hollow space being embodied between the electrode regions and the counterelectrode. The resulting configuration is particularly compact. In addition, exclusively standard processes are utilized with this type of manufacture, which processes can easily be integrated into manufacturing methods for other components such as, for example, an acoustic transducer produced by surface micromechanics. In this fashion, different sensor elements having a common evaluation circuit can also be integrated on one chip.

If the diaphragm structure and the counterelectrode of the sensor element according to the present invention are produced in a layer configuration above a substrate, the seismic mass can likewise easily be patterned out of this layer configuration. It is particularly advantageous if it is patterned at least in part out of the same layers as the counterelectrode, thus resulting in an opening in the counterelectrode into which the seismic mass projects.

One possibility for increasing the sensitivity of the sensor element according to the present invention is to enlarge the seismic mass. It proves to be advantageous in this context to pattern at least a portion of the seismic mass out of the substrate, so that the seismic mass also encompasses substrate material in addition to the layer material of the counterelectrode.

In an advantageous embodiment of the invention, the counterelectrode of the sensor element is perforated, so that the hollow space between the diaphragm structure and the counterelectrode is connected to the environment via the perforation openings in the counterelectrode. The structurally conditioned damping of the diaphragm structure having the seismic mass can thereby be largely reduced, and the sensitivity of the sensor element can thus also be increased.

Also contributing to this are spring elements that are embodied in the diaphragm structure as suspension mounts for the individual electrode regions. This is because the damping of the sensor structure is likewise reduced by the openings in the diaphragm structure between the individual spring elements. In addition, intrinsic tensile or compressive stresses in the sensor structure can be dissipated by way of such spring elements; this likewise has a positive effect on the sensitivity of the sensor element.

As mentioned above, there are various ways of advantageously embodying and further developing the teaching of the present invention. The reader is referred, for that purpose, on the one hand to the description herein, and on the other hand to the explanation below of several exemplifying embodiments of the present invention with reference to the drawings.

DETAILED DESCRIPTION

Figure 1:
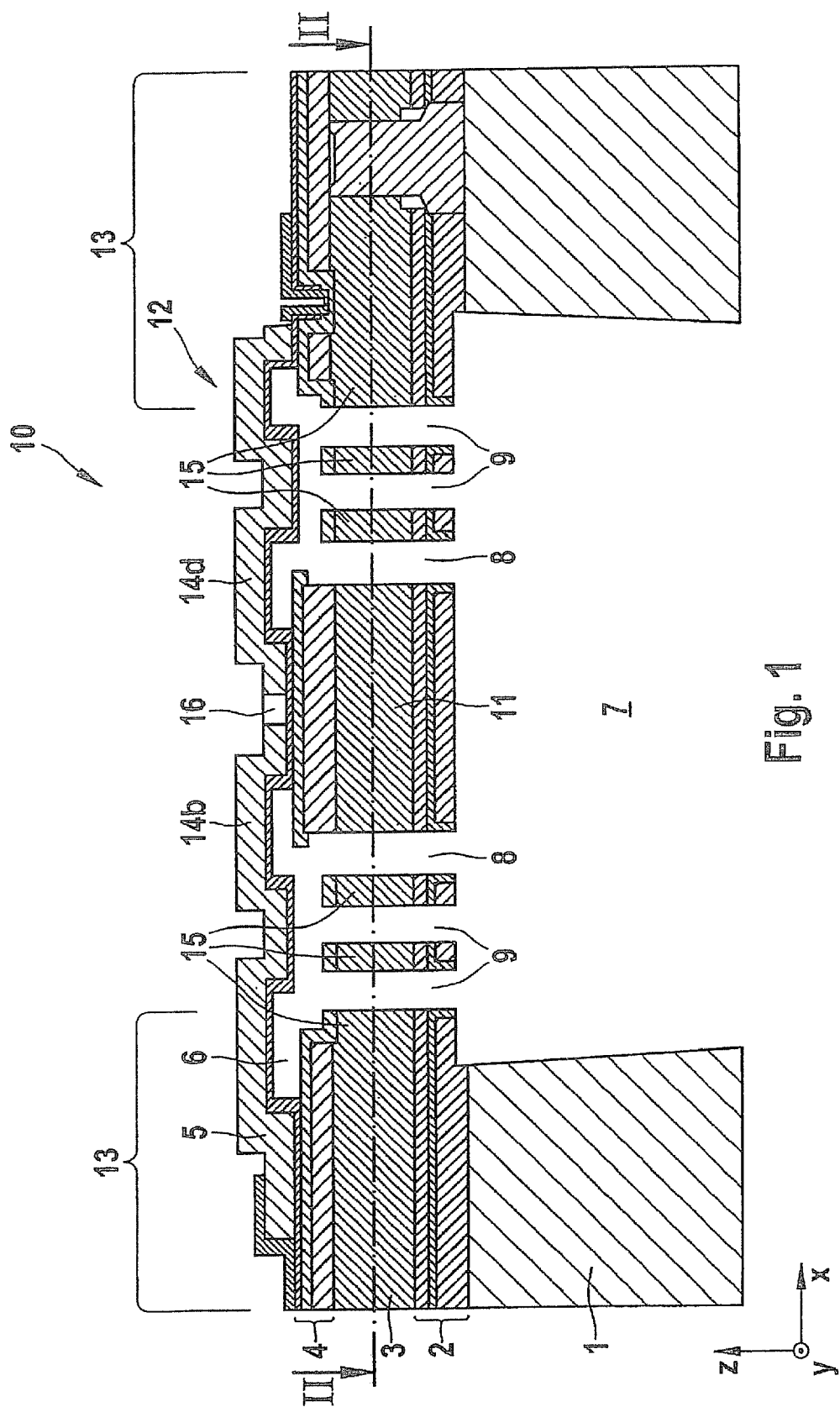
FIG. 1 shows a cross section through the layer configuration of a first sensor element according to the present invention.

Sensor element 10 depicted in FIG. 1, for sensing accelerations in three spatial directions, encompasses a seismic mass 11 that is suspended in a frame 13 via a diaphragm structure 12 so that it is deflectable in all three spatial directions. The deflections of seismic mass 11 are sensed capacitively. Diaphragm structure 12 of sensor element 10 encompasses for this purpose, according to the exemplary embodiments and/or exemplary methods of the present invention, four electrode regions 14a to 14d that are electrically separated from one another, of which only electrode regions 14b and 14d are evident in the sectioned depiction of FIG. 1. All four electrode regions 14a to 14d are mechanically coupled via seismic mass 11; this is illustrated in particular by FIGS. 3a to 3d. Sensor element 10 further encompasses a stationary counterelectrode 15 for electrode regions 14a to 14d, is embodied below the deformable region of diaphragm structure 12.

In the exemplifying embodiment depicted here, the entire sensor structure is embodied in a layer configuration above a semiconductor substrate 1. The functions of the individual layers of this configuration will be explained below only insofar as they are of significance for the structure and manner of operation of sensor element 10 being discussed here. For example, the layer configuration encompasses at least one first insulating layer 2 by which semiconductor substrate 1 is electrically insulated from the further layers of the layer configuration; at least one layer 3 in which counterelectrode 15 is implemented, so that this layer 3 is hereinafter referred to as counterelectrode layer 3; at least one second insulating layer 4 above counterelectrode layer 3; and, above second insulating layer 4, at least one diaphragm layer 5 in which diaphragm structure 12 is embodied. Seismic mass 11 is in this case embodied substantially in counterelectrode layer 3.

Diaphragm structure 12 depicted here was disengaged using surface micromechanics methods. For this, a sacrificial layer was produced above second insulating layer 4, and was patterned in an annular shape in accordance with the geometry of diaphragm structure 12. Only then was diaphragm layer 5 applied. The annular diaphragm structure 12 was then disengaged by removing the sacrificial layer; this created a hollow space 6 between diaphragm structure 12 on the one hand and counterelectrode layer 3 and second insulating layer 4 on the other, which space extends toroidally around the region of seismic mass 11. The sacrificial layer was removed subsequently to patterning of the back side of the substrate.

Figure 2:
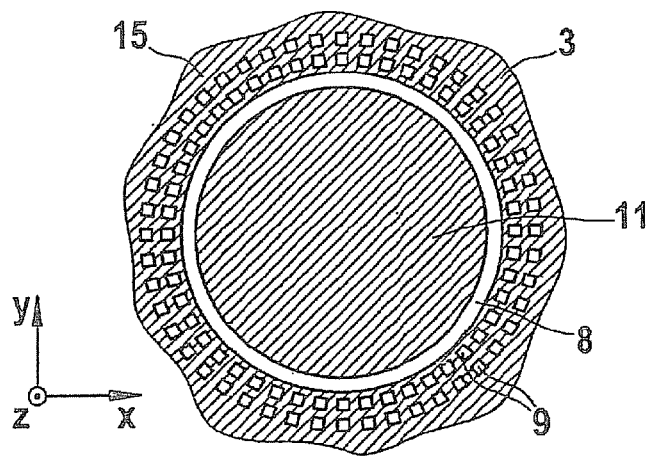
FIG. 2 shows a plan view of the patterned counterelectrode of a sensor element according to the present invention.

In the course of this back-side patterning, seismic mass 11 of sensor element 10 was also defined and disengaged. For this, firstly a cavity 7 was produced in the back side of semiconductor substrate 1. This cavity 7 is limited in depth by first insulating layer 2, and here extends laterally over the entire region of diaphragm structure 12, but can also have a lesser or greater lateral extension. In a subsequent trenching process also proceeding from the back side of the substrate, an annular trench 8 was generated, as well as perforation openings 9 that extended through first insulating layer 2, counterelectrode layer 3, and second insulating layer 4 into the sacrificial layer. Only then was the sacrificial layer above the annular trench 8 and perforation holes 9 removed, proceeding from the back side of the substrate. Diaphragm structure 12 was disengaged along with seismic mass 11, so that the latter is now suspended on frame 13 only via diaphragm structure 12 and is deflectable both perpendicular to the layer planes in the Z direction, and in the layer plane in the X/Y direction. With this embodiment, seismic mass 11 thus projects into an opening in counterelectrode 15 that is embodied annularly around trench 8. Perforation openings 9 serve to deattenuate and vent the sensor structure, and for pressure equalization. The layout of counterelectrode layer 3 having the annular trench 8 and perforation openings 9 is depicted once again separately in FIG. 2; the disposition, number, and size of the perforation openings can be selected as required. This layout corresponds to a section along axis II-II in FIG. 1.

As already mentioned, according to the exemplary embodiments and/or exemplary methods of the present invention four electrode regions 14a to 14d, electrically separated from one another, are implemented in diaphragm structure 12 of sensor element 10, these regions being mechanically coupled via seismic mass 11. FIGS. 3a to 3d show four different layouts for electrode regions 14a to 14d of sensor element 10 depicted in FIG. 1. In all four depictions (FIGS. 3a to 3d) the contour of seismic mass 11 is depicted as a dashed circular line 11. In addition, in all four embodiments electrode regions 141a to 141d, 142a to 142d, 143a to 143d, 144a to 144d are constituted by circular disk segments of the same shape and size, which are electrically insulated by a cross-shaped electrically insulating region 16 in diaphragm structure 12 and/or by a corresponding cutout in diaphragm structure 12.

Figure 3A:
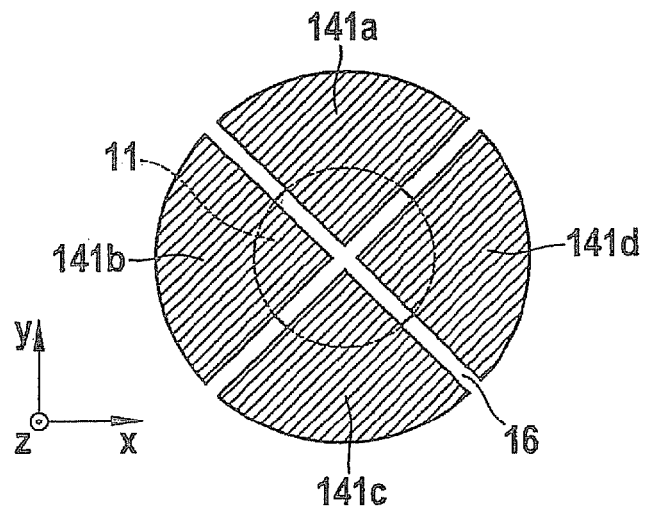
FIG. 3a, FIG. 3b, FIG. 3c, and FIG. 3d show respective plan views of four different diaphragm structures of a sensor element according to the present invention.
Figure 3B:
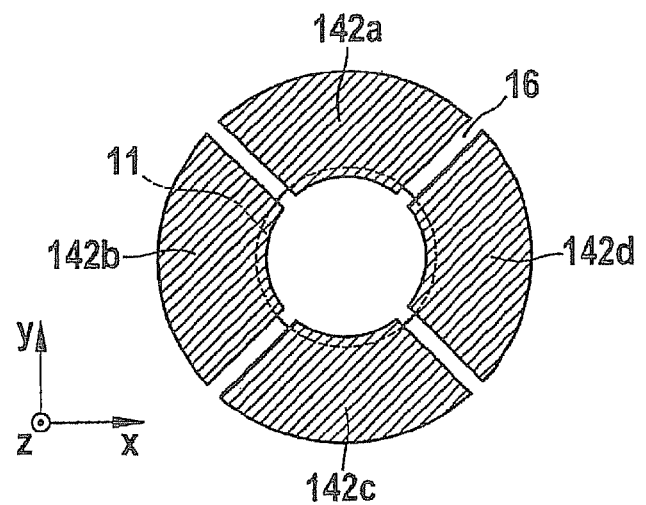
Figure 3C:
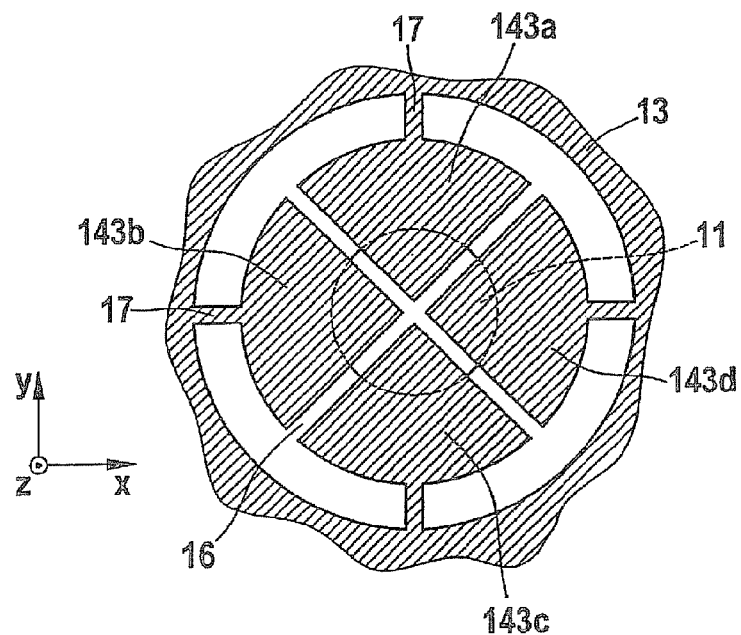
Figure 3D:
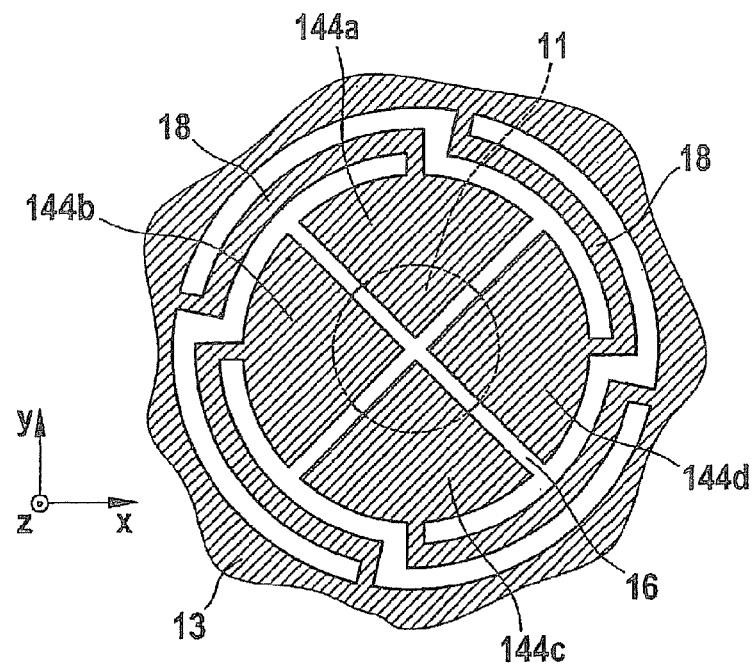

In the case of FIG. 3a, the electrode surface of the individual electrode regions 141a to 141d each extend over an entire quarter of the circular disk, so that the tips of these circular disk quarters are disposed on the surface of seismic mass 11. In contrast thereto, in the case of FIG. 3b the electrode regions 142a to 142d are embodied in the shape of quarter-circle segments that extend only as far as the outer edge of seismic mass 11, in the case of the variants depicted in FIGS. 3c and 3d, electrode regions 143a to 143d (FIG. 3c) and 144a to 144d (FIG. 3d) are embodied, as in FIG. 3a, in the shape of circular disk quarters. Electrode regions 143a to 143d are, however, suspended via struts 17, and electrode regions 144a to 144d via spring elements 18, in frame 13, resulting in an increase in sensitivity as compared with the variant depicted in FIG. 3a. Struts 17, like spring elements 18 as well, are embodied in the edge region of the respective diaphragm structure 12.

Figure 4:
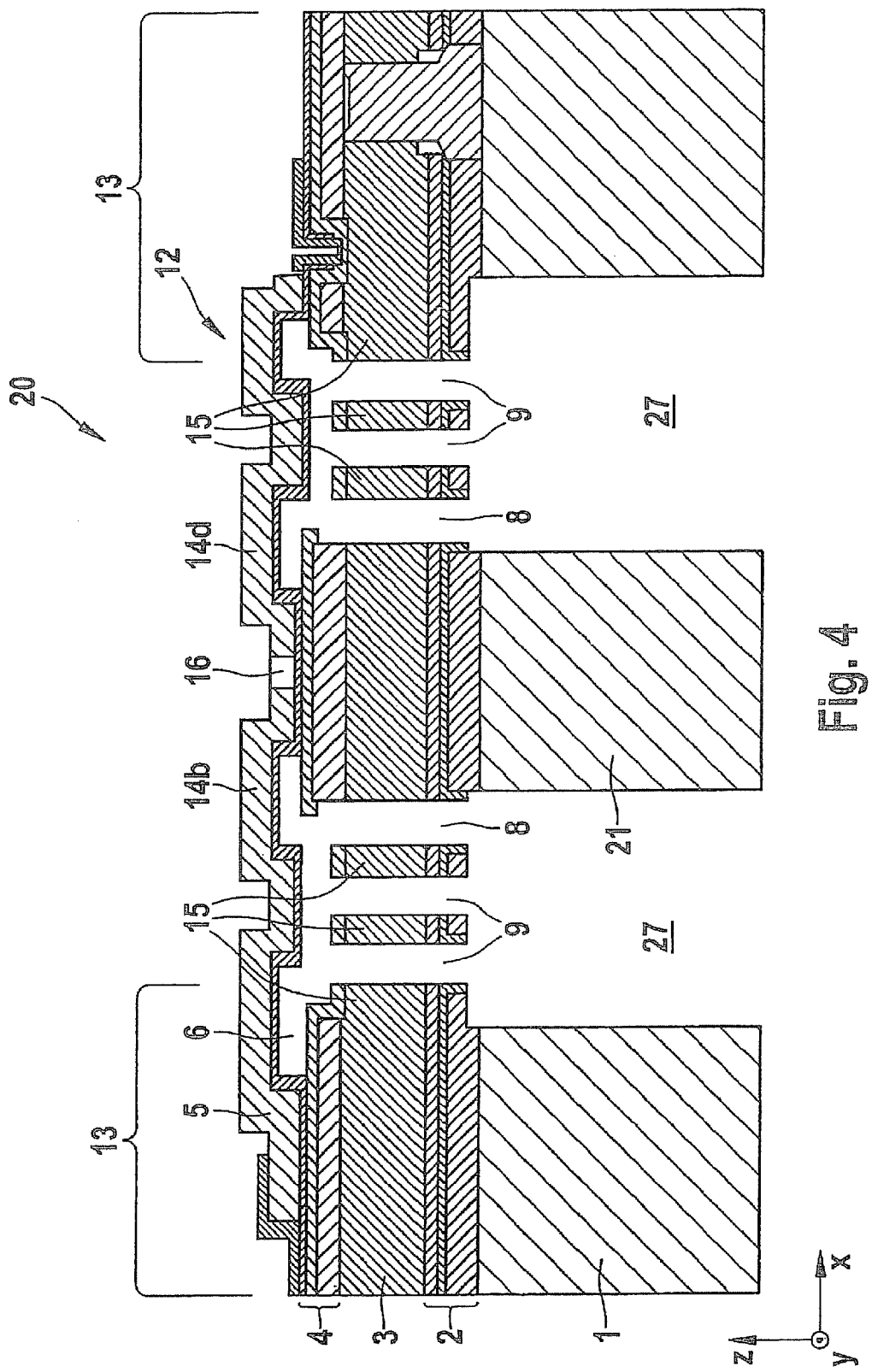
FIG. 4 shows a cross section through the layer configuration of a second sensor element according to the present invention.

The layer configuration and structure of sensor element 20 depicted in FIG. 4 correspond substantially to those of sensor element 10 depicted in FIG. 1. In contrast thereto, seismic mass 21 of sensor element 20 extends over the entire thickness of the layer configuration, including substrate 1. An annular trench 27 was produced for this purpose, instead of cavity 7, in the context of back-side patterning.

Figure 5A:
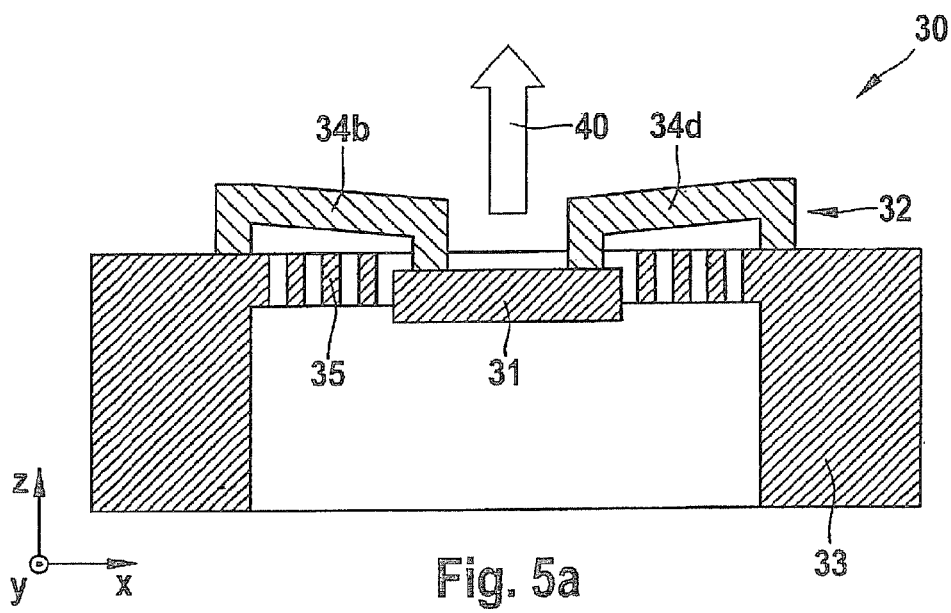
FIG. 5a and FIG. 5b depict schematic sections through a sensor element according to the present invention under the influence of accelerations acting in three spatial directions.
Figure 5B:
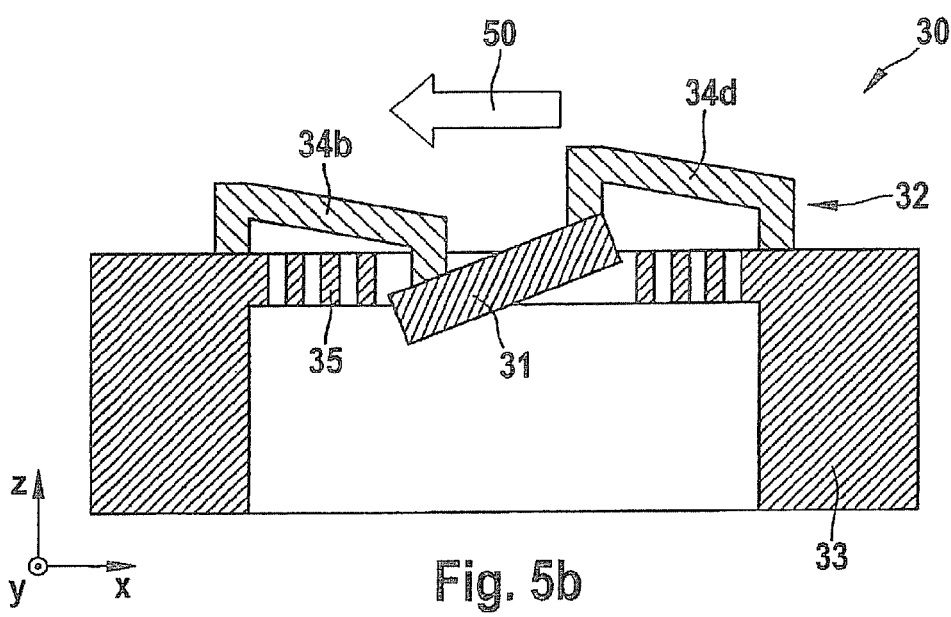

FIGS. 5a and 5b illustrate the manner of operation of a sensor element 30 according to the exemplary embodiments and/or exemplary methods of the present invention having a seismic mass 31 deflectable in three spatial directions, having a diaphragm structure 32 that functions as a suspension mount for seismic mass 31 in a frame 33 and encompasses four electrode regions 34a to 34d that are electrically separated from one another, of which, here again, only electrode regions 34b and 34d are depicted. These four electrode regions 34a to 34d are mechanically coupled via seismic mass 31. Sensor element 30 furthermore encompasses at least one stationary counterelectrode 35 for capacitive sensing of the deflections of the diaphragm structure having seismic mass 31. The four electrode regions 34a to 34d form, in this context, four capacitance pairs C1 to C4 together with the shared counterelectrode 35.

FIG. 5a shows the behavior of sensor element 30 under the influence of an acceleration acting in a Z direction, depicted here in the form of arrow 40. This acceleration 40 perpendicular to the diaphragm plane results in a uniform narrowing of the gap between electrode regions 34a to 34d and counterelectrode 35, and thus in a uniform increase in the capacitance of all four capacitance pairs C1 to C4. An acceleration in an X/Y direction, i.e. in the diaphragm plane, as depicted in FIG. 5b as arrow 50, results in a nonuniform change in the gap. The direction and magnitude of acceleration 50 in the X/Y plane can consequently be ascertained by sensing and evaluating, for example by way of difference measurements, the various changes in the individual capacitances C1 to C4.

What is claimed is:

1. A sensor element for sensing accelerations in three spatial directions, comprising:
   at least one seismic mass deflectable in three spatial directions;
   a diaphragm structure that functions as a suspension mount for the seismic mass and encompasses at least one electrode; and
   at least one stationary counterelectrode for capacitive sensing of deflections of the diaphragm structure;
   wherein the diaphragm structure encompasses at least four electrode regions, electrically separated from one another, that are mechanically coupled via the seismic mass,
   wherein the at least one stationary counterelectrode is perforated into a plurality of perforation openings.

2. The sensor element of claim 1, wherein the counterelectrode has an opening into which the seismic mass projects.

3. The sensor element of claim 1, wherein the diaphragm structure having the electrode regions separated electrically from one another, and the counterelectrode, are embodied in a layer configuration above a substrate, so that a hollow space is located between the electrode regions and the counterelectrode.

4. The sensor element of claim 3, wherein the seismic mass is patterned at least in part out of the same layer as the counterelectrode.

5. The sensor element of claim 3, wherein at least a portion of the seismic mass is patterned out of the substrate.

6. The sensor element of claim 3, wherein the hollow space is connected to a cavity or a trench via the perforation openings in the counterelectrode.

7. The sensor element of claim 1, wherein spring elements are embodied in the diaphragm structure as suspension mounts for each of the electrode regions.

8. The sensor element of claim 3, wherein the hollow space extends above the region of the at least one seismic mass.

* * * * *

UNITED STATES PATENT AND TRADEMARK OFFICE
CERTIFICATE OF CORRECTION

PATENT NO. : 8,353,213 B2  Page 1 of 1
APPLICATION NO. : 12/678669
DATED : January 15, 2013
INVENTOR(S) : Zoellin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this
First Day of September, 2015

Michelle K. Lee
*Director of the United States Patent and Trademark Office*